Feb. 2, 1960    J. J. BYRNES    2,923,376
FILTER APPARATUS
Filed May 24, 1955
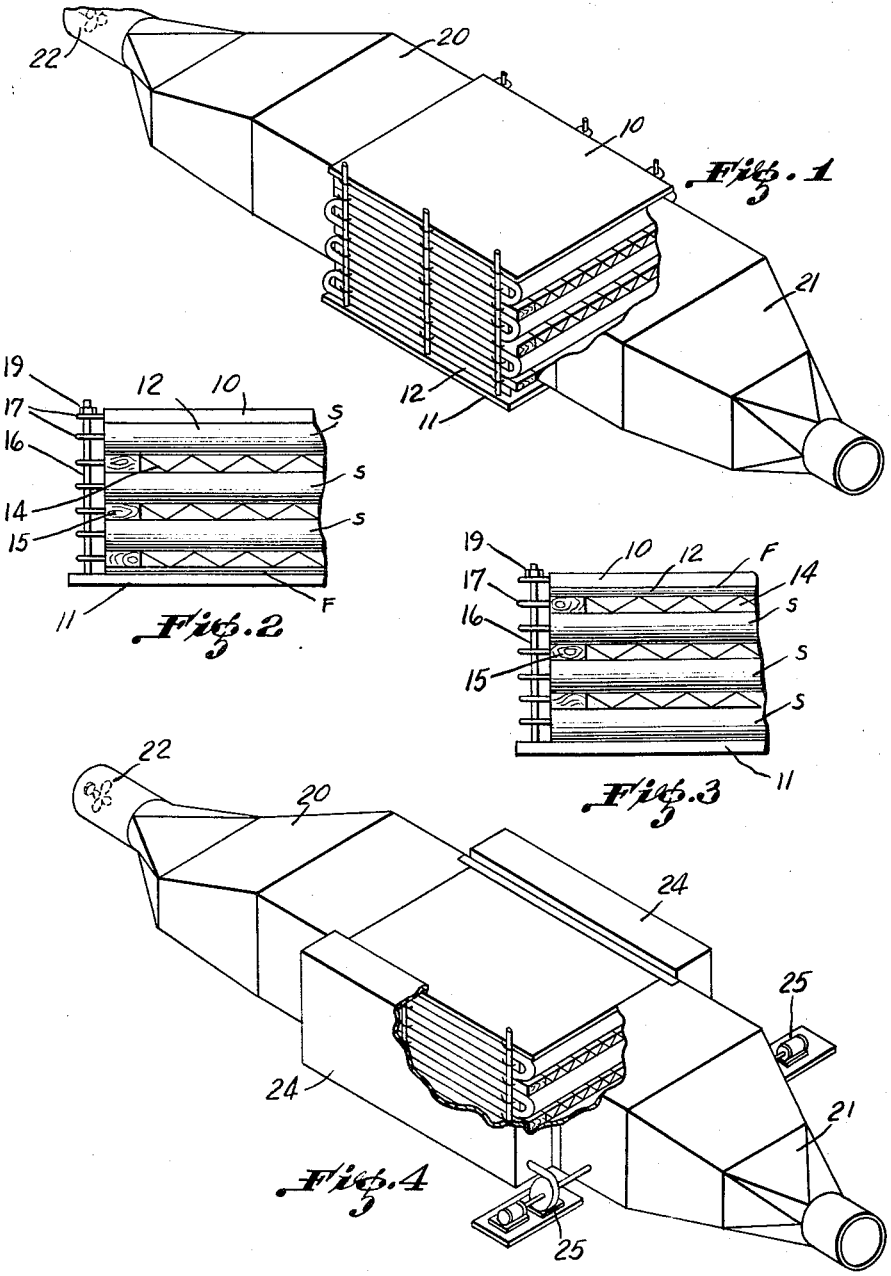
INVENTOR
JAMES J. BYRNES
BY
ATTORNEY

United States Patent Office 2,923,376
Patented Feb. 2, 1960

2,923,376

FILTER APPARATUS

James J. Byrnes, Jericho, N.Y., assignor to Associated Nucleonics, Inc., a corporation of New York Application May 24, 1955, Serial No. 511,440

7 Claims. (Cl. 183—71)

The present invention relates to the separation of finely divided particles from a stream of gas, and, more particularly, to a filter assembly of the reticulated screen type wherein the filter material providing the screen is arranged to provide zigzag folds.

Heretofore, it has been proposed to construct such filters by arranging a sheet of high efficiency filtering medium to provide a series of zigzag folds having inlet and outlet pleats, spacing adjacent folds by a separating member, encasing this bundle in a frame having open inlet and outlet ends, and connecting the frame ends between influent and effluent ducts.

The difficulty with such filter constructions is that the bundle and the inner walls of the frame must be sealed together with near-perfect seals in order to prevent leakage of contaminated gas into the effluent duct. Such seals involve laborious operations and often are not made perfectly which results in a high number of filters failing to pass inspection.

Accordingly, an object of the present invention is to provide a filter of the type indicated herein which overcomes the foregoing difficulties and disadvantages.

Another object is to provide such a filter which is highly efficient and reliable.

Another object is to provide such a filter which is readily assembled and taken apart for replacement of the filter material.

Another object is to provide such a filter which is economical to manufacture by mass production methods.

A further object is to provide such a filter which lends itself to a wide variety of types of installation and uses.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been found that the foregoing objects can be accomplished by providing an assembly of filter components having the ends of the bundle merely butted against the ducts or the openings of confined spaces through which the stream flows, instead of surrounding the filter bundle with the duct. Such an assembly permits a small amount of leakage to occur but the relative gas pressures are such that no leakage of contaminated gas into the purified effluent gaseous stream may occur.

In the drawing:

Fig. 1 is a perspective view of a filter in accordance with the present invention, a portion being broken away for clearness.

Fig. 2 is a fragmentary elevational view of the effluent end of the filter assembly.

Fig. 3 is a fragmentary elevational view of the influent end of the filter assembly.

Fig. 4 is a perspective view of a modified filter, a portion being broken away for clearness.

Referring to the drawing in detail and more particularly to Figs. 1 to 3 thereof, a filter assembly is shown which generally comprises a top plate 10, a bottom plate 11, a sheet or web 12, of filter material arranged to provide a series of superimposed zigzag transverse sheet-like sections or folds F positioned between the plates 10 and 11, a lengthwise channelled or corrugated separator member 14 between each pair of adjacent or opposing folds, a bar 15 between each pair of folds adjacent each side edge of each of the members 14 and means for retaining the aforementioned elements in assembly to provide the so-called filter bundle.

The filter sheet or web 12 is formed of suitable porous material adapted to prevent the passage of finely divided particles or aerosols therethrough. For example, the sheet or web may be formed of paper, felt or other fibrous material, preferably of a thickness to facilitate slight compression thereof by the bar 15. If desired, the filter material may be impregnated with substances adapted to adsorb harmful gases to remove the same from the filtered gas.

As shown herein the first or uppermost fold underlies the top plate 10 (Figs. 1 and 2), and the next or second fold is below the uppermost separator member 14. The folded section S joining these two folds abuts the forward end of this separator member (as viewed in Figs. 1 and 3), but the channels of this separator member are open at the end shown in Fig. 2. A bar 15 is disposed between these two folds adjacent each of the side edges of these folds and this separator member. The next or second separator member underlies the second fold, and the folded section S joining the second and third folds abuts the end of this separator member, as shown in Fig. 2, with the end of this separator member shown in Fig. 3 being open. This pattern is continued to the lowermost fold which underlies the lowermost separator member and overlies the bottom plate 11, whereby, at both ends of the filter bundle, alternate separator members are open and the others abutted by the filter sheet or web to provide a series of parallel channels arranged for the entrance of gas in one direction and the exit of gas in the other direction.

The means for retaining the filter bundle in assembly, for example, may comprise vertical rods 16 mounted on the bottom plate 11 at each side thereof and apertured laterally extending lugs 17 at the side edges of the top plate 10 and the bars 15 through which the rods are adapted to pass. If desired, the lugs 17 may be frictionally retained on the rods 16 to hold the plates 10 and 11 in a position to effect compression of the filter folds by these bars, or the upper end of each rod may be threaded for the reception of a nut 19 adapted, upon application, to more positively effect compression of the filter folds to a predetermined degree.

Referring again to Fig. 1, an arrangement is shown wherein the ends of the bundle or assembly are butted and sealed between an influent chamber 20 and an effluent chamber 21. The chambers are shown herein as ducts, although it is conceivable that either or both of the ends of the assembly could be butted against a wall of a room, compartment or chamber formed with an opening therein through which the gaseous media is adapted to flow.

In operation, the gaseous media from the inlet duct 20 flows freely into the open ended separator or spacing members 14 and a small portion thereof is filtered through the folded sections S at the end of the assembly shown in Fig. 3. The media so entering the members 14 is filtered through the folds above and below these members whereby all of the filtered media can enter the separator or spacing members 14 having open ends at the end of the assembly shown in Fig. 2 and flows into the outlet duct 21. Since the compression of the filter folds is not sufficient to form a perfect seal at the side edges thereof, slight leakage of media will occur at these edges.

In the arrangement shown, the side edges of the filter assembly are exposed to the atmosphere and the pressure in the inlet and outlet ducts and filter assembly is maintained above atmospheric pressure, for example by a fan or impeller 22 in the inlet duct 20 to insure that all leakage which occurs at the side edges of the assembly is lost to the atmosphere and does not enter the decontaminated effluent stream.

In use, the apparatus just described may be located in a contaminated gaseous media space, such as an air space in communication with the atmosphere. For instance, the filter assembly might be installed on the outside of a building in a contaminated atmosphere to supply purified air to the inside of the building wherein the pressure is maintained slightly above atmospheric pressure. Where space is readily available, the filter assembly may be placed inside the building with the fan so located that the filter assembly is maintained at a negative or below room pressure by placing the fan 22 in the duct 21, whereby the direction of the leakage air is reversed and purified room air now leaks into the filter assembly.

In Fig. 4, an arrangement is shown which is suitable for use where it is not feasible to place the filter assembly in the decontaminated space and to maintain the pressure in the outlet duct or chamber at or above atmospheric pressure. In such cases, plenums 24 are placed around the sides of the filter assembly described with reference to Figs. 1 to 3 which are pressurized with decontaminated or purified gaseous media from the effluent stream. For example, this may be accomplished by an auxiliary fan or blower 25 having an inlet in fluid flow communication with the outlet duct 21 and having an outlet in fluid flow communication with the plenum. In this way, the direction of leakage is reversed but decontaminated media is supplied to satisfy such leakage.

Alternatively, the main blower 22 could be located in the effluent duct at the outlet end of the filter assembly to draw the gaseous media therethrough and pressurizing media for the plenums could be obtained off the discharge side of this blower, thereby eliminating the need for the auxiliary fans 25.

From the foregoing description it will be seen that the present invention provides highly efficient filter apparatus, which is simple and economical in construction, is readily assembled and facilitates replacement of the filter material upon becoming contaminated. The apparatus can be arranged to cope with all problems of installation in a manner whereby in no case contaminated gas or air can enter the purified stream.

While the present invention has been described in connection with filters of the zigzag screen type, by way of example, it will be apparent that the controlled leakage principle involved herein is applicable to other types of filters.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A filter assembly comprising a sheet of filter material arranged to provide a series of superimposed zigzag folds having longitudinally extending exposed side edges, a longitudinally channelled member between each pair of opposing folds having its side edges disposed inwardly of the side edges of said folds, a pair of bars structurally independent of each other between each pair of opposing folds and each adjacent one side edge of each of said members arranged to permit leakage of fluid media outwardly of said exposed side edges through said filter material, top and bottom plates for the aforementioned structure, and means for retaining the aforementioned elements in assembly.

2. A filter assembly according to claim 1, wherein said means are constructed and arranged to urge said plates towards each other with said folds slightly compressed at the side edges thereof to control leakage therethrough.

3. A filter assembly according to claim 2, wherein said means include apertured lugs on said bars and a rod extending through said lugs and attached to said plates.

4. In combination, an influent chamber for gaseous media; an effluent chamber; and a filter assembly having its ends disposed between said chambers comprising top and bottom plates, a sheet of filter material arranged to provide a series of superimposed zigzag folds and positioned between said plates, a member between each pair of opposing folds having longitudinal channels in communication with one of said chambers, a bar adjacent each side of said members and positioned between opposing pairs of folds, means for retaining said folds, members and bars between said plates, plenums for enclosing the sides of said filter assembly, and means for supplying filtered gaseous media under pressure from said effluent chamber to said plenums.

5. In combination, an influent chamber for gaseous media; an effluent chamber; and a filter assembly having its ends disposed between said chambers comprising top and bottom plates, a sheet of filter material arranged to provide a series of superimposed zigzag folds and positioned between said plates, a member between each pair of opposing folds having longitudinal channels in communication with one of said chambers, a bar adjacent each side of said members and positioned between opposing pairs of folds, means for retaining said folds, members and bars between said plates, a plenum for enclosing each side of said filter assembly, and pressurizing means for each of said plenums having an inlet in fluid flow connection with said effluent chamber and having an outlet in fluid flow communication with said plenum.

6. In a filter assembly for decontaminating gaseous media, the combination of influent and effluent passageway means, filter means between said passageway means having exposed side edges, elements adapted to effect slight compression of said filter means at its side edges and permit passage of gaseous media thereat, a plenum enclosing the side edges of said filter means at which gaseous media may pass, and means for supplying filtered gaseous media under pressure from said effluent passageway means to said plenums.

7. A filter assembly according to claim 6, including means for urging said elements together to vary the degree of compression of said filter means and thereby control the leakage of gaseous media.

References Cited in the file of this patent

UNITED STATES PATENTS

| 2,008,751 | Davies | July 23, 1935 |
| 2,681,155 | Graham | June 15, 1954 |

FOREIGN PATENTS

| 830,878 | Germany | Feb. 7, 1952 |